April 25, 1933.  T. P. SILVESTER  1,905,190
MARBLE WORKING MACHINE
Filed Nov. 24, 1928  4 Sheets-Sheet 2
Fig. 2.
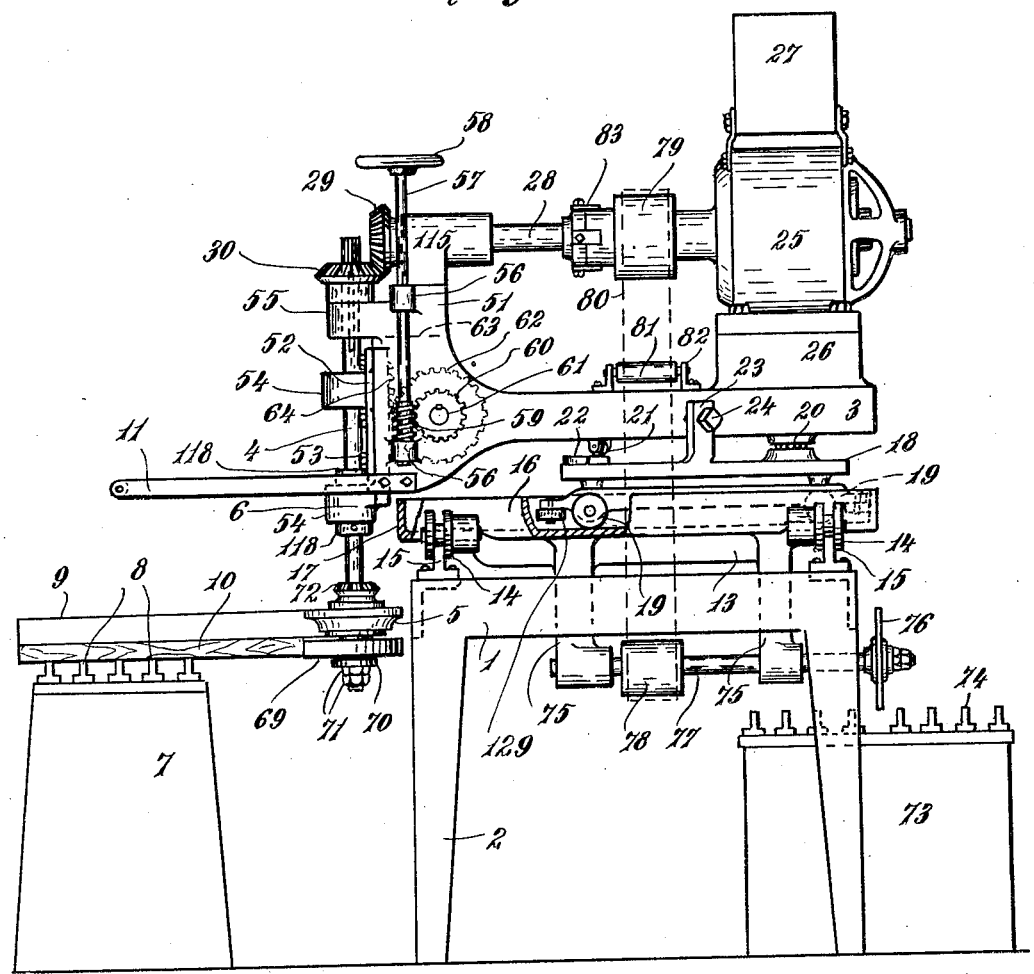
Fig. 4.
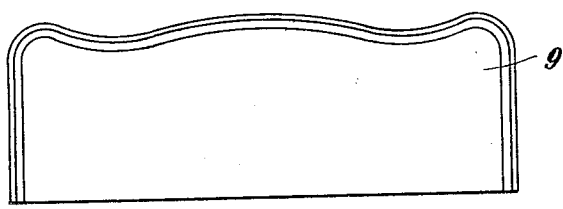
Fig. 5.
Inventor
Thomas Paul Silvester
by William F. Nickel
Attorney

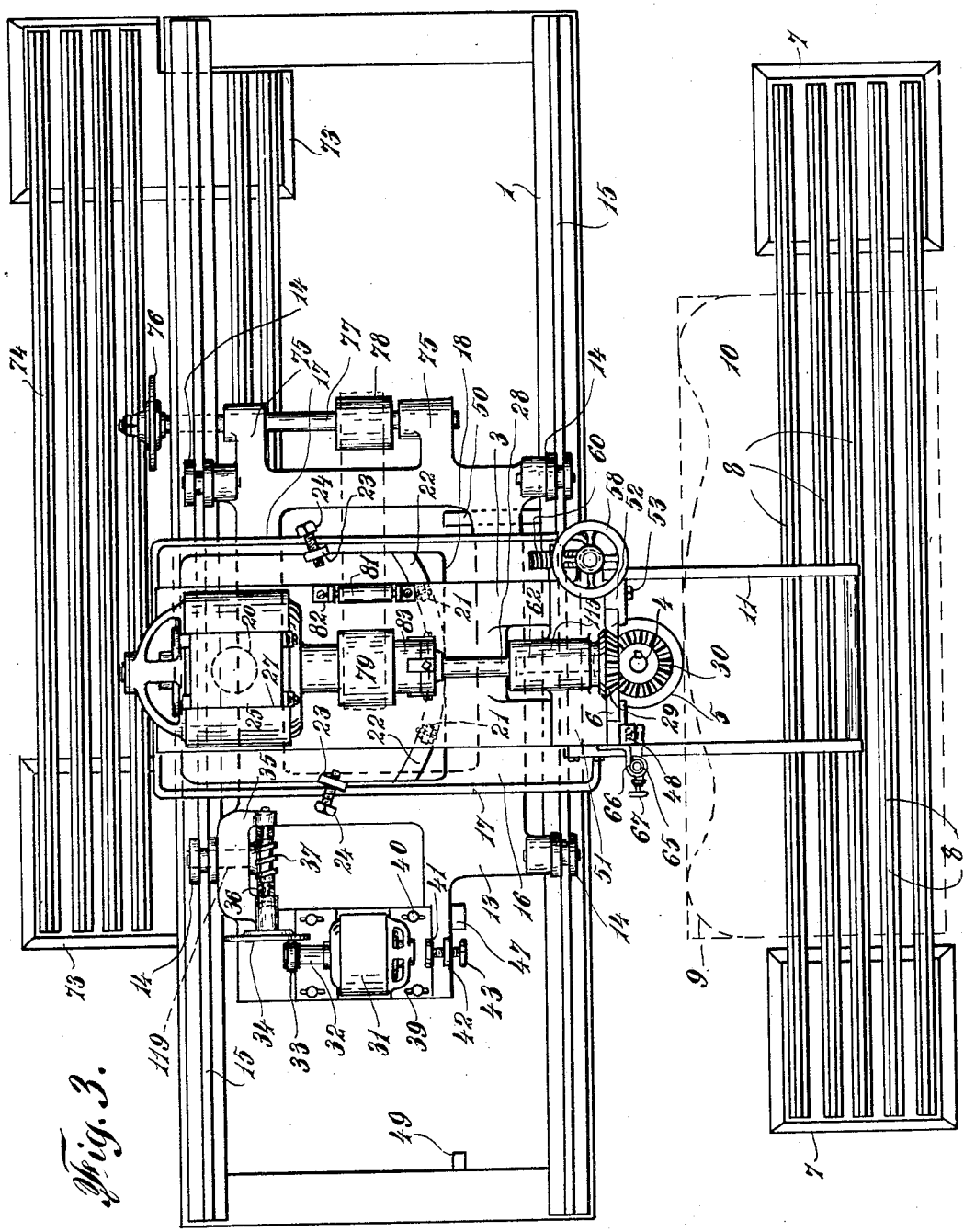

April 25, 1933.  T. P. SILVESTER  1,905,190
MARBLE WORKING MACHINE
Filed Nov. 24, 1928   4 Sheets-Sheet 4
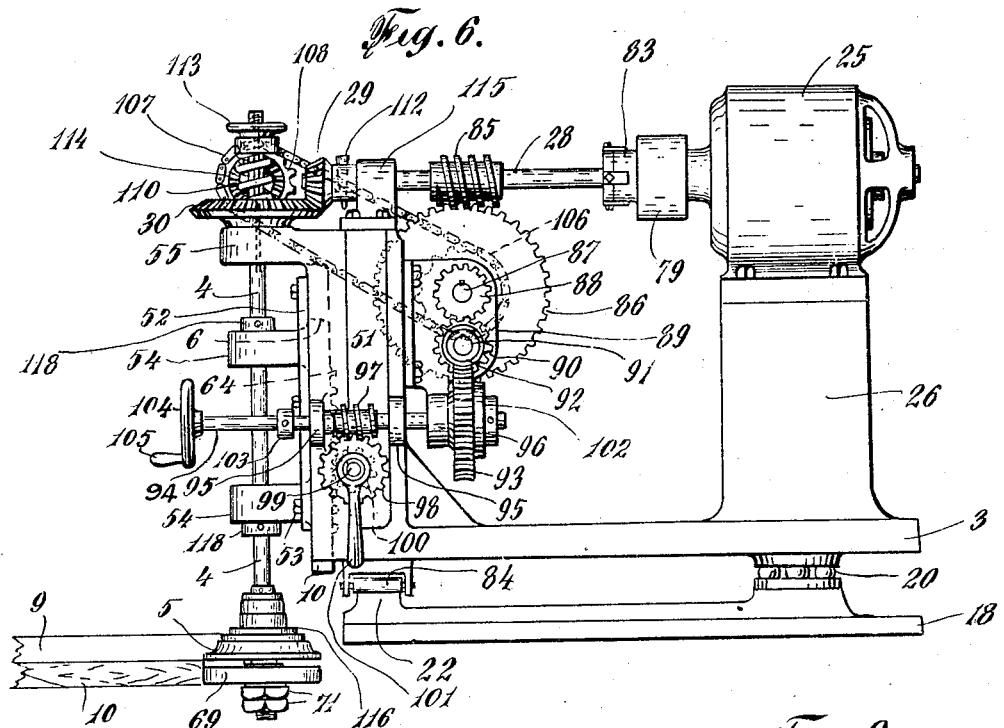
Inventor
Thomas Paul Silvester
by William F. Nickel
Attorney Patented Apr. 25, 1933

1,905,190

UNITED STATES PATENT OFFICE

THOMAS PAUL SILVESTER, OF NEW YORK, N. Y., ASSIGNOR OF ONE-THIRD TO LISA SILVESTER AND ONE-THIRD TO VINCENT J. SILVESTER, BOTH OF NEW YORK, N. Y.

MARBLE WORKING MACHINE

Application filed November 24, 1928. Serial No. 321,674.

My invention relates to improvements in machines for working marble; particularly a machine for shaping, by cutting or grinding, and polishing and finishing, marble in the form of slabs intended for use as the tops of stands, bureaus and other articles of furniture.

An object of this invention is to provide an apparatus by which a flat slab or plate of marble can be quickly and surely cut to impart to it the desired outline, and polished and finished along its edges with a minimum expenditure of power and no risk of loss or damage with respect to the material in the course of the shaping process.

A further object of this invention is to provide a machine for shaping slabs of marble by following the outline of a selected design or pattern; thus operating in a manner that is independent of the skill, or want of skill, of individual workmen; and giving a greatly increased output as well as a very superior product.

Another object of the invention is to provide a machine for working marble which is simple and easy to manipulate, certain in performance, and economical in practice; which can be installed at small cost, and which will greatly lessen the need for experienced labor in plants where articles of this kind are manufactured.

A still further object of the invention is to provide a machine for working slabs of marble adapted to give an artistic edge to the slab as well as the required form and outline.

An additional object of the invention is to provide an apparatus which is designed not only for cutting and grinding, but for boring also when an aperture in a slab of marble is necessary.

Heretofore the shaping of marble slabs has been done chiefly by hand with all the attendant risk of waste, caused by carelessness or mistake on the part of the workman, whose product varied in excellence according to the skill with which a task was performed. With my invention, the disadvantages and loss incident to previous methods are eliminated, and with ordinary materials, containing no serious defects, a perfectly shaped and finished article can always be obtained.

The nature of the invention is set forth in the following description taken with the drawings, upon which several modifications of an apparatus serving my purpose are illustrated. But the disclosure is explanatory only, and I may vary the devices actually shown herein, without departing from the principle of the invention, or exceeding the spirit of the appended claims.

On the drawings,

Figure 2 is a side view of same;

Figure 3 is a top plan thereof;

Figures 4 and 5 show details;

Figure 1:
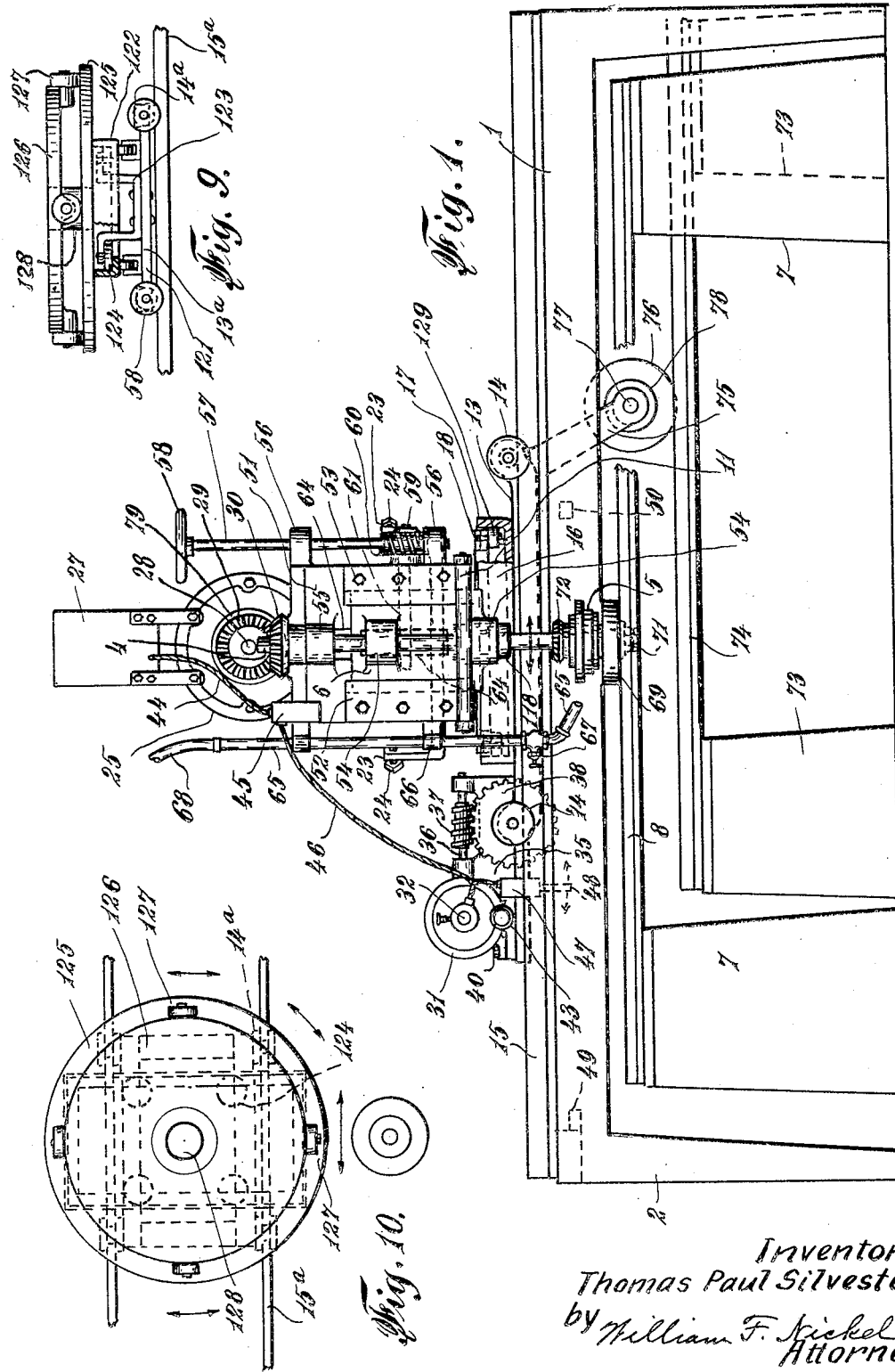
Figure 1 is a front view of an apparatus according to this invention.

Figures 6 and 7 are respectively a side view and a top view showing a modification of the machine presented in Figures 1, 2 and 3; and Figures 8, 9 and 10 are respectively a top view of part, a side view and a full top view of another modification.

The same numerals identify the same parts throughout.

The invention herein embraces both the mechanical apparatus employed and the method of proceeding to gain the desired ends.

The machine is shown in Figures 1, 2 and 3 and comprises a rail bed 1, supported upon legs 2. Above the rail bed is a frame 3 upon which is mounted the principal parts of the apparatus. This frame carries a vertical shaft 4, and to the lower end of this shaft 4 is affixed a cutter 5 or grinder, which may have the form of a rotatable disk of some hard abrasive material, such as carborundum.

The shaft or spindle 4 together with the cutter 5 can be adjusted up and down by means of the cross-head 6 at the front of the frame 3; so that the cutter 5 can always be at the level of the slab of marble that is being worked. To support this slab I provide a work stand consisting of legs or pillars 7 spanned by rails or bars 8, which are parallel to the rail bed 1 and spaced from this rail bed a suitable distance. In Figure 3 the relative positions of the machine and the work stand are indicated, with a slab of marble to be worked, shown in broken lines 9, on top of the work stand, together with a pattern 10, also shown in broken lines, the outline of which is to be reproduced. As indicated in Figure 2, the pattern is underneath on the bars 8 and the marble slab 9 on top at the level of the cutter 5, or the pattern may be on top, with the marble slab under it, in practice.

In operation, as will be fully described later herein, the cutter moves along the edge of the marble and grinds away the marble until the edge of the marble has the same outline as that of the pattern.

For this purpose, the frame 3 carrying the spindle 4 and cutter 5 must be mounted so that it can be carried from end to end along the rail bed, enabled to swing to some extent from side to side about the pivot; and further, shifted in a transverse direction with respect to the rail bed, so that the position of the spindle 4 and the cutter 5 from the work stand can be regulated.

To enable the machine to be manipulated to advantage, it is equipped with the handle 11. This handle comprises a pair of bars secured to the sides of the frame 3 and projecting out over the work stand where these bars are united at their ends by means of a cross bar of which the operator can take hold. The operator takes his place with the work stand between himself and the machine. The marble slab to be shaped is laid upon the work stand with the pattern in the desired position, and the position of the cutter 5 is then controlled by the operator by means of the handle 11.

I have shown the cutter 5 as having such a peripheral surface that, as it grinds away the marble and forms an edge, this edge will comprise a shoulder indicated at 12 in Figure 5; the remaining portion of the width of the edge being rounded.

Obviously, however, a cutter of a different shape, such as a cutter with a purely cylindrical, conical or other surface might be employed.

To shift the frame 3 along the rail bed 1 from end to end, the machine includes a carriage 13 having four or a different number of grooved rollers 14 which fit the rails 15 of the rail bed 1. On top of this carriage and extending transversely of the rails 15 is a pan shaped base 16 with a surrounding upturned rim 17. This base forms a guide way for a wheeled table or truck 18 supported upon rollers 19. The truck is capable of moving back and forth in the guide 16 from one side of the rail bed to the other. The frame 3 is pivotally supported upon the top of the truck 18, as indicated at 20; this pivot point being located toward the back end of the truck and frame with reference to the end which carries the spindle 4; that end being the front end. On the lower face of the frame I also mount a couple of rollers 21 at each side; these rollers resting upon a curved track 22 disposed on the top of the truck at the front end thereof opposite the pivot 20. The pivotal support of the frame 3 may consist of a thrust roller bearing; and the frame 3 is thus mounted after the fashion of a turn-table on the truck 18. Hence, the frame 3 can be swung from side to side on the truck 18; and to limit this swinging movement I provide lugs 23 at each side of the truck 18; these lugs projecting upward at the sides of the frame 3; and each stop having a threaded hole to receive a bolt 24. By means of these bolts the lateral swinging movement of the frame about the pivot 20 can be limited.

From the description thus far, it will be apparent that the frame 3 can be moved along the rail bed 1 because it is mounted upon the carriage 13; also the frame can be drawn forward by the operator taking hold of the handle 11 and pulling it, because the wheel truck 18 will then move in the transverse guide 16; and of course the reverse movement towards the rear can be produced simply by pushing on the handle 11. Further, if the frame 3 is to move from side to side, it is swung about the pivot 20 as far as the bolts 24 will permit.

On the rear end of the frame 3 I mount an electric motor 25 upon a projection 26; and on the top of this motor is a box 27 containing switches and other electrical controlling devices. The shaft of this motor is indicated at 28. It extends forward through a bearing at the top of a vertical extension at the front of the frame 3 and carries a fixed bevel gear 29 which meshes with a fixed bevel gear 30 keyed on the spindle 4. The motor thus rotates the shaft 4 and furnishes the power which operates the cutter 5.

To cause the carrier 13 to travel on the rails 15, the carriage is provided at one end with an electric motor 31 having a shaft 32 carrying a friction gear 33. This gear engages the face of a friction gear 34, and at 35 is a projection on the adjacent part of the carriage, supporting bearings to receive the shaft 36 of the gear 34. On this shaft is a worm 37 which meshes with a worm wheel 38 fixed upon a shaft rotatably mounted in the projection 35 and carrying the adjacent roller 14; which is made fast to this shaft. Thus rotation of the motor 31 will cause the said roller 14 to be revolved through the gearing according to the direction of rotation of the motor 31 to propel the carriage to the right or left. The other remaining rollers 14 are mounted upon fixed pintles or journals and merely turn without furnishing any of the motive power.

The motor 31 can be adjusted on the carriage 13, by providing the base thereof with slots 39 through which pass bolts 40 into the carriage 13 at suitable points. As shown in Figure 3, when these bolts 40 are loosened, the motor can be shifted, to vary the point of engagement of the gear 33 with the gear 34. Hence, the relative speed of the gear 34 and the speed of travel of the carriage can be regulated. The base of the motor containing the slots 39 may have a lug 41 and the carriage may carry a similar lug 42 adjacent the lug 41, the lug 42, mounting a threaded bolt 43, which connects with the lug 41 in a manner that permits it to turn in this lug without being free to move longitudinally into or out of the lug 41. This bolt when turned will shift the motor 31 in one direction or the other, and the motor is held fast by tightening the bolts 40, after it is shifted as desired.

The main leads for supplying current to the motor 25 are of course carried into the switch box 27 through which connection is made to the motor 25; and from this box also extend leads 44 to conduct current to the motor 31. Leads 44 first run to a box 45, that is on the frame 3 and contains a switch to connect and disconnect the motor 31; this box having a lid or cover which can be opened to get at the switch in the box 45, so that the circuit to the motor 31 can be controlled. From the switch box 45 the leads 46 are lead to the motor 31 and to a switch box 47 on the carriage 13. From this switch box extends a switch arm 48. This switch arm projects downward to be engaged by a stop 49 on the rail bed 1, at one end of the latter; and a similar stop 50 is carried by the rail bed beneath the rails to engage this switch arm 48 when the carriage 13 is at the other end of its travel. Hence, with the motor 31 operating and with the switches in the boxes 45 and 47 closed, if the carriage is moving to the left, the motor 31 will be stopped as soon as the switch arm 48 reaches the stop 49. If the carriage is going in the other direction, the supply of current to the motor 31 will be cut off when the switch arm strikes the other stop 50. If desired, the switch in the box 47 may be a reversing switch so that whenever the carriage 13 reaches one end of its travel, the circuit is automatically changed to stop the motor and then to make the motor rotate in the opposite direction. Then the carriage 13 with all of the parts which are mounted upon it will continue to move back and forth on the rail bed 1 as long as the switch in the box 45 is closed. It can be stopped at any point by opening the switch in box 45. If desired, guards can be arranged at both ends of the rails to prevent the carriage from over-running the ends of the rails and cooperate with the stops 49 and 50 and the reversing switch operated by the arm 48.

The vertical extension at the front part of the frame 3 is indicated at 51. The cross head 6 can be moved up and down on the front face of this extension; and at the sides of this extension are the vertical guides 52 for the cross head held in place by bolts 53. The cross head has a couple of bearings 54 for the spindle 4 and projecting from the front face of the extension 51 at the top is another bearing 55, on which rests the gear 30 rotated with the spindle 4.

Further, at one side of the extension 51 are two bearings 56 in vertical alignment to receive a spindle 57 which can be turned by means of a hand wheel 58 at the top. This spindle carries adjacent the lower bearing 56, a worm 59 to engage a gear wheel 60 on the shaft 61. This shaft is mounted in horizontal bearings in the frame 3 and it carries a gear wheel 62 in a vertical slot 63 at the middle of the extension 51. On the rear face of the cross head 6 is a vertical rack 64, the teeth of which project into the slot 63 to mesh with the gear 62. Hence, by turning the hand wheel 58, the cross head 6 can be shifted up and down in the guide ways provided by the pieces 52; and by tightening the bolts 53, the cross head 6 can be secured in any adjusted position. Thus, the level of the cutter 5 can be fixed as required for the working of the marble slab 9.

I also show at 65 a length of pipe mounted in bearings 66 attached to the extension 51 on the side opposite the spindle 57. This pipe can be controlled by the valve 67 and may be connected with a hose 68 to supply water thereto, the lower end of the pipe being bent towards the cutter 5 to discharge water upon the marble slab when the cutter 5 is in operation, and thus the formation and scattering of dust are prevented.

The spindle 4 carries upon its lower end below the cutter 5 a guide roller 69, which is free to rotate on the spindle 4. A washer 70 and binding nuts 71 prevent the roller 69 and cutter 5 from dropping off the spindle 4. The cutter 5 may be provided with a fixed hub having a gear wheel 72; so that when it is necessary to work this cutter to smooth its surface, it can be removed from the spindle 4 and put into a suitable machine, which will turn the cutter through the gear 72.

The mode of operation will now be clear: To shape and polish the edge of a slab of marble, a selected pattern is first laid upon the work-stand and the marble slab is put on top of the pattern, both being secured in any suitable way. The circuit of the motor 25 is then closed so as to rotate the spindle 4 and cutter 5. When current flows to the motor 31 the travel of the carriage begins, and at any time the workman can, by taking hold of the handle 11, swing the frame 3 or move the frame back and forth in the guide 16. The position of the cutter 5 is thus controlled; and if the start is made at the right end of the marble slab 9, the edge thereof can be ground all the way from right to left. The cutter is of course fixed on the shaft 4 and must rotate with it, but the wheel 69 is loose and acts to abut the edge of the pattern 10, when the marble is ground away deep enough from its edge so that at no time can the cutter grind away the marble further than the edge of the pattern. The outline of the pattern can thus be easily, quickly and surely reproduced, with no danger of mistake or damage to the material. The vertical adjustment of the shaft 4 and cutter 5 is of course made in the beginning.

I may also utilize a second work-stand on the other side of the rail bed, this work-stand consisting of the support 73 and bars 74. The end of the carriage opposite the motor 31 may have downward projecting arms 75 between the rails 15 to carry a cutter 76 on a shaft 77, rotatably mounted in bearings at the lower ends of the arms 75. On this shaft is a pulley 78 and a shaft 28 of the motor 25 may carry a pulley 79 to be connected to the pulley 78 by a belt 80. The cutter 76 is of the type now commonly used for cutting slab marble and with such a cutter mounted on the machine I can perform other operations in addition to those above described. The frame 3 may have an idler pulley 81 mounted in bearings 82 at one side to serve as a guide for the lower part of the belt 80 so that the belt will not rub against the edge of the frame 3 or the edge of the rim 17 of the guide 16. The upper side of the belt will run clear of the parts of the apparatus and require no guide pulley. The guide pulley 81 will of course be located at the proper point to give the desired result.

Normally, the pulley 79 will be loose on the shaft 28 and this shaft may carry a coupling of any suitable design so that the pulley 79 may be connected to the shaft 28 when the belt 80 is to be used. Of course when the cutter 76 is not to be put to work, the belt 80 will not be in place. The coupling is shown at 83.

The construction shown in Figures 6 and 7 is for a machine built in all respects similar to that above described, with additional parts for continuously feeding the spindle 4 downward for boring purposes, so that the machine can be used as above set forth and for boring also. The frame 3 has rollers 84 somewhat larger than the rollers 21 above described, on its bottom to engage the track 22; and the spindle 28 carries a worm 85 fixed thereon to engage a wormwheel 86 beneath it on a horizontal transverse shaft 87, which carries a pinion 88. The shaft 87 is mounted in bearing parts 89 on the back base of the extension 51; and the pinion 88 meshes with a similar pinion 90 on a shaft 91 parallel with the shaft 87, and likewise mounted in the bearing parts 89. The pinion 88 thus turns the pinion 90 and transmits motion to a worm 92 on shaft 91 to turn a wormwheel 93 below it. This wormwheel is fixed to a horizontal shaft 94 parallel with the shaft 28 and mounted in two bearings 95 at the side of the extension 51. The rear end of the shaft also passes through a bearing 96 integral with the adjacent bearing part 89, and this shaft 94 carries a worm 97 between the bearings 95. The worm engages a wormwheel 98 below it on a shaft 99, mounted in the extension 51 and this extension has a vertical slot 63 as before, so that the shaft 99 can carry in the slot a pinion 100 to mesh with rack teeth 64 on the rear face of the cross-head 6. Affixed to the end of the shaft 99 adjacent the gear 98 is a handle or lever 101. On the end of the shaft 94 beyond the bearing 96, is the wormwheel 93 and the extremity of the shaft beyond this wormwheel carries a clutch member 102, which may be of the cone type to engage a corresponding recess in the adjacent face of the wormwheel 93. The wormwheel 93 is loose upon the shaft 94 and the clutch member 102 is fixed upon the shaft 94. When the shaft 94 is moved to the right, the clutch 102 can engage the wheel 93; while the movement of the shaft 94 in the opposite direction disengages the clutch.

A fixed collar 103 may be carried on shaft 94 adjacent the front bearing 95 to limit the rearward movement of this shaft; and the front end of this shaft carries a wheel 104 and crank 105, so that it can be turned by hand. Manifestly, the rotation of the motor besides turning the gears 29 and 30 and shaft 4, will act through the gearing 85, 86, shaft 87, gear 88, gear 90, shaft 91, worm 92, wheel 93, shaft 94, worm 97, gear 98, shaft 99, gear 100 and rack 64 to lower the head 6 and shaft 4; but the train of gearing between the shaft 28 and shaft 4 greatly reduces the speed of the motor; so that the down feed of the shaft 4 is slow.

I may also mount upon the shaft 87 at the end remote from the worm 92 sprocket gear 106 connected by the sprocket chain 107 with a sprocket wheel 108 on a shaft 109. This shaft will be mounted in a bearing at one side of the extension 51 and will carry a bevel wheel 110 to mesh with the bevel wheel 30. The hubs of the bevel wheel 29 and 110 will have openings shown at 111 and these openings will be extended into the shafts 28 and 109 respectively. At 112 is a cotter pin and when this pin is in the hole passing through the hub of the gear 29 and shaft 28, the drive will be direct from the motor to the gear 30; gear 110 now being loose on the shaft 109. If, however, the cotter pin 112 is taken out of the gear 29 and put into the hub of the gear 110 to make this gear fast on the shaft 109, the drive from the shaft 28 to the shaft 4 must take place through the worm 85, wheel 86 and sprocket gearing to the wheel 30. This gives a slower rate of rotation to the shaft 4. The end of the shaft 4 may project up through the top bearing 55 and wheel 30, which is keyed thereon; at its top it carries a nut 113, and between this nut and the gear 30 the shaft 4 is encircled by a spring 114. This spring will normally urge the shaft upward to lift the cutter 5. The gear 30 and shaft 4 slidably engage each other.

The bearing for the shaft 28 at the top of the extension 51 is shown at 115; and there may be a washer 116 on the top face of the cutter 5 abutting nuts or collars on the shaft 4. Below the cutter, as before, is the guide wheel 69 and nuts 71 to support the guide wheel and cutter.

When it is desired, with this machine to rotate the shaft 4 only, the shaft 94 is pushed to the rear to disengage the clutch member 102. Then the wheel 104 can be turned to rotate the gear 98 through the worm 97, together with the shaft 99 and gear 100, to engage the rack 64 and shift the cross-head 6 into the desired position where the cross-head can be fixed as before by tightening the bolts 53 of the guides 52. Then the motor will drive the shaft 4 either directly through the bevel 29 or at a slower speed through the worm 85, wheel 86, sprocket gearing and bevel gear 110. In this way the marble can be cut and polished along the edge, as before, by manipulating the handle 11, which is omitted from the Figures 6 and 7 for the sake of clearness.

When, however, it is desired to provide a boring operation with the shaft 4, a chuck or drill can be attached to the lower end of the shaft 4, either in place of the cutter 5 and guide wheel 69, or in addition to these parts. The cross-head 6 must then be free to slide in the guide ways and the guides 52 must be loosened somewhat for this purpose. Further, if necessary the member 113 can be turned up to ease the compression of the spring 114 so that the weight of the spindle 4 and the parts which it carries at its lower end, will normally tend to draw this spindle downward. Then the wheel 104 is grasped to pull forward the shaft 94 to make the clutch member 102 engage the wormwheel 103. With the motor shaft 28 in rotation, the shaft 4 will now be rotated and so will the boring implement (not shown) at its lower end; and motion will be transmitted through the gearing to the shaft 94 to turn the gear 98, shaft 99 and gear 100, very slowly, so that the cross-head 6 is fed downward. If the parts are properly adjusted, the weight of the spindle 4 and the rotating parts it carries, will prevent any reactionary force, due to the motion transmitted from the shaft 28, from making the shaft 94 back up and disengage the clutch member 102. The shaft 4 being thus fed downward, the desired hole is bored, and when the boring is finished, the handle or lever 101 can be grasped and pulled in a clockwise direction (Fig. 6). The gear 98 now acts upon the worm 97 as if the latter were a rack, and the shaft 94 is moved rearward to throw out the clutch member 102. The downward feed of the shaft 4 is then stopped; and then with the operator still holding the lever 101, the wheel 104 can be turned so that the worm 97 will cause the wheel 98 to rotate and the shaft 99 to act upon the gear 100 to act upward on the rack 64 and raise the cross-head 6. Thus, the shaft 4, with all the parts it carries can be lifted. The downward feed of the shaft for boring need be only for a couple of inches or so.

In Figure 7, a bearing 117 on the rear face of extension 51 is shown for the shaft 99, and in Figure 6 collars are indicated at 118, fixed to the shaft 4, above and below the bearings 54. The upper end of the shaft 4 may be provided with a key way so that this end can slide in the gear 30 when the shaft is fed downward.

In Figure 3, the shaft for the gear 38 and adjacent drive roller is indicated at 119. The front bearing for the shaft 28, in Figures 1, 2 and 3, is indicated at 120.

In Figures 8, 9 and 10 I show another method of getting the same results by means of a rotating spindle 4a to carry a cutter 5a at the level of the marble. The cutter will rotate, but can be mounted so that it will not shift its position. Instead the marble and the pattern will be shifted. For that purpose I may provide a stand adjacent the shaft 4a to support rails 15a. On this stand or rail bed will be the carriage 13a with rollers 14a and the carriage will comprise longitudinal bars 121. Such a carriage can be shifted from side to side along the rails 15a by hand. On top of the carriage is a frame 122, the sides of which may be made of angle bars riveted together. To the longitudinal bars 121 of the carriage, I affix short bars 123, bearing rollers 124, to engage the frame 122 inside at four points. These rollers retain the frame 122 on the carriage, but permit it to be shifted on the carriage transversely of the rails 15a. On the frame 122 may be affixed top 125; and this top may carry a round plate 126 carrying rollers 127 to enable it to rest on the top 125 with a pivot or journal on the top 125 projecting through a central opening in the plate 126, the pivot being shown at 128. The marble slab 9 and pattern 10 may be laid upon the plate 126 and secured in any suitable manner. The workman can then turn the marble by rotating the plate 126, and shift it toward and from the cutter 5a by causing movement of the frame 122; or from side to side by moving the carriage and everything else on the rails 15a. Thus the marble slab can be cut and finished as before.

I do not show any means for securing the marble 9 and pattern 10 in place upon the work-stand, in Figures 1, 2 and 3, but obviously the marble and the pattern may be clamped fast in these views and in Figures 8, 9 and 10 in any suitable manner.

With the marble on top of the pattern as shown in Figures 2 and 6 the marble 9 and pattern 10 may be separated slightly by inserting suitable spacing members. Also the position of the marble 9 and pattern 10 can be reversed so that the wood pattern 10 is on top where it can be seen while the marble slab is being worked.

I may also omit the wood pattern and work the marble slab by tracing the desired outline on the slab and then cut and grind the marble away accordingly. In some cases, further, I may use a slab of marble which has already been worked as a pattern to cut another slab of marble to the same shape; and to do this it is only necessary to make the necessary adjustments of the cutter 5 and guide wheel 69.

As indicated in Figures 2 and 3, the truck 18 may have additional wheels 129 at both ends to engage the inner sides of the rim 17.

Having described my invention what I believe to be new and desire to secure and protect by Letters Patent of the United States is:

1. Apparatus for shaping and finishing slab marble comprising a rail bed, a carriage mounted to travel thereon, a transverse guideway on the carriage, a truck having rollers thereon movable in said guideway, a frame pivoted on the truck, a motor on the frame, a vertical shaft rotatably carried on said frame, a cutter on the shaft, connections between the motor and the shaft to turn the shaft and the cutter, and means on the frame to regulate the vertical position of the shaft and cutter.

2. Apparatus for shaping and polishing slab marble comprising a rail bed, a carriage on same, rollers on the carriage engaging the rail bed, an electric motor to operate one of said rollers to propel the carriage, a rotary shaft having a cutter thereon above the carriage, a switch for the motor, and stops on the rail bed to engage and operate the switch at each end of the travel of the carriage on the rail bed to control the motion of the carriage.

3. Apparatus for shaping and finishing marble comprising a frame mounted for movement in two directions at right angles to each other, and to swing about a pivot, a vertical shaft, bearings for said shaft at one end of the frame, a cutter on the shaft, means for vertically adjusting the shaft, and a motor on the frame to rotate the shaft.

4. Apparatus for shaping and finishing slab marble comprising a work stand for the slab and a flat pattern, a rail bed adjacent to the stand, a carriage having rollers engaging the rail bed, an electric motor on the carriage to transmit power to one of the rollers to propel the carriage, a switch on the motor, stops on the rail bed at each end of the travel of the carriage, the switch having a projecting arm to strike against the stops to control said motor, a transverse guide on the carriage, a truck having wheels in the guide and movable towards the front and back of the carriage, a frame pivoted on the truck, a handle at the front of the frame to shift the latter, stops on the guide to limit the motion of the frame about the pivot, a motor on the frame, a vertical shaft, bearings at the front of the frame for said shaft, a cutter and guide wheel thereon, and means for adjusting the vertical position of the shaft.

5. In apparatus for shaping and finishing slab marble the combination of a frame mounted for movement in two directions at right angles, and pivoted to swing from one side to the other, the front of the frame having an upright extension, vertical guideways on the front of the extension, a cross head in the guideways, bearings on the crosshead, a shaft in the bearings, a rack on the shaft, gearing engaging the rack, a shaft and handwheel connected to the gearing to adjust the crosshead, and a motor on the frame to operate said first-named shaft.

6. Apparatus for shaping and finishing slab marble, comprising a shaft, a cutter thereon, means for mounting the shaft so that it can be shifted with the cutter while rotating, a motor, gearing for transmitting motion from the motor to the shaft, and additional gearing for transmitting motion to the shaft from the motor at a different rate of speed, said gearing each including a gear having an opening and a shaft having a similar opening, with a cotter pin to connect in one of said gears, the other gear then being idle.

Signed at New York, in the county of New York, and State of New York, November, A. D. 1928.

THOMAS PAUL SILVESTER.